_United States Patent_ [19]

Greenwood

[11] 3,825,116

[45] July 23, 1974

[54] PARTICLE DISENGAGING AND FINES REMOVAL

[75] Inventor: Arthur R. Greenwood, Niles, Ill.

[73] Assignee: Universal Oil Products Company, Des Plaines, Ill.

[22] Filed: Jan. 15, 1973

[21] Appl. No.: 323,578

[52] U.S. Cl. .............................. 209/141, 209/161
[51] Int. Cl. ............................................. B07b 7/00
[58] Field of Search ........................... 209/138–143, 209/158–161, 145, 474, 476

[56] References Cited
UNITED STATES PATENTS

| 459,570 | 9/1891 | Beynon | 209/139 R |
| 2,001,184 | 5/1935 | Cuppy | 209/139 R X |
| 2,638,219 | 5/1953 | Gordon et al. | 209/139 R X |
| 3,142,869 | 8/1964 | Gould et al. | 209/141 X |

FOREIGN PATENTS OR APPLICATIONS

| 315,304 | 9/1956 | Switzerland | 209/140 |

_Primary Examiner_—Frank W. Lutter
_Assistant Examiner_—Ralph J. Hill
_Attorney, Agent, or Firm_—James R. Hoatson, Jr.; Robert W. Erickson; William H. Page, II

[57] ABSTRACT

An apparatus is disclosed for disengaging particles from a mixture of a lift fluid and particles, and for the separation of fine particles from larger particles. The apparatus utilizes a two-stage elutriation conduit to produce countercurrent contacting of lift fluid and particles and cause the separation of fine particles from larger particles. A higher upward fluid velocity in the smaller cross-sectional area lower stage of the elutriation conduit enhances fine particle removal. The lower velocity in the upper stage increases large particle retention. The elutriation conduit is present within a larger receiving hopper which receives the large particles which have been separated. Fine particles and lift fluid are recovered from the top of the elutriation conduit.

7 Claims, 2 Drawing Figures

PATENTED JUL 23 1974 3,825,116

PARTICLE DISENGAGING AND FINES REMOVAL

BACKGROUND OF THE INVENTION

1. Field of the Invention

The field of art to which this invention pertains is that of fluid-solid separation apparatus, and more particularly the separation of solids from fluid through the use of an elutriation fluid including the removal of catalyst fines in moving bed hydrocarbon conversion processes.

2. Description of the Prior Art

The prior art is abundant with patents and publications relating to the use of separation apparatuses for removing particles from a moving stream of particles and fluid, and for classifying the particles according to their respective particle size. Through the use of cyclone separation means it is possible to separate particles by their size distribution and to produce a fluid stream essentially free of solid particles. However, the use of cyclones or similar apparatus to classify particles according to their size is typically dependent upon the use of centrifugal force to cause the particle separation. A disadvantage of cyclone type separations is the resulting particle attrition due to particle contact with the walls of the cyclone. The attrition is undesirable since the fine materials produced can cause line plugging or catalyst losses.

The basic principles I utilize include fluidization of the smaller particles to be eluted from the larger particles. The invention is specifically applicable to processes in which it is desired to transfer catalyst from one vessel to another, especially in moving bed reforming, hydrocracking, town gas production or other similar moving bed processes.

SUMMARY OF THE INVENTION

My invention can briefly be summarized as a particle disengaging and fines removal system which comprises a particle receiving hopper which collects particles falling from a vertically positioned elutriation conduit, and a particle-lift fluid conduit positioned so that the particle-lift fluid inlet conduit extends in an upward direction into the receiving hopper and into a lower section of the elutriation conduit. The elutriation conduit has upper and lower sections with the upper section having a larger inside cross-sectional area than its lower section. Lift fluid and fine particles are removed from the top of the elutriation conduit. The larger particles pass in a downward direction through the lower section of the elutriation conduit and into the receiving hopper for removal by an outlet means connected to the bottom of the receiving hopper. The smaller cross-sectional area in the lower stage of the elutriation conduit has a higher upward fluid velocity which enhances fine particle removal. A lower velocity in the upper stage increases large particle retention.

A broad embodiment of my invention resides in a particle disengaging and fines removal apparatus comprising in combination: (a) a receiving hopper comprising a vertically positioned enclosed vessel having upper and lower sections; (b) a vertically positioned elutriation conduit connected to the upper section of said receiving hopper and in communication with said hopper, said elutriation conduit comprising upper and lower sections with said upper section of said conduit having a larger internal horizontal cross-sectional area than said lower section of said conduit; (c) a fine particle and fluid outlet means connected to the upper section of said elutriation conduit to allow the removal of fine particles and fluid from said elutriation conduit; (d) a vertically positioned particle-lift fluid inlet conduit means passing through the wall of said receiving hopper and extending in an upward direction into said hopper and into the lower section of said elutriation conduit, to thereby allow the passage of particles and lift fluid through said conduit means and into said elutriation conduit; and, (e) a particle outlet means connected to said receiving hopper to allow the passage of particles out of said hopper.

BRIEF DESCRIPTION OF THE DRAWING

The attached drawing shows a preferred embodiment of the apparatus of my invention and is not intended to unduly restrict the scope of the appended claims.

FIG. 1 shows a vertical side view of the apparatus while FIG. 2 shows a horizontal sectional view as indicated in FIG. 1.

Figures 1, 2:
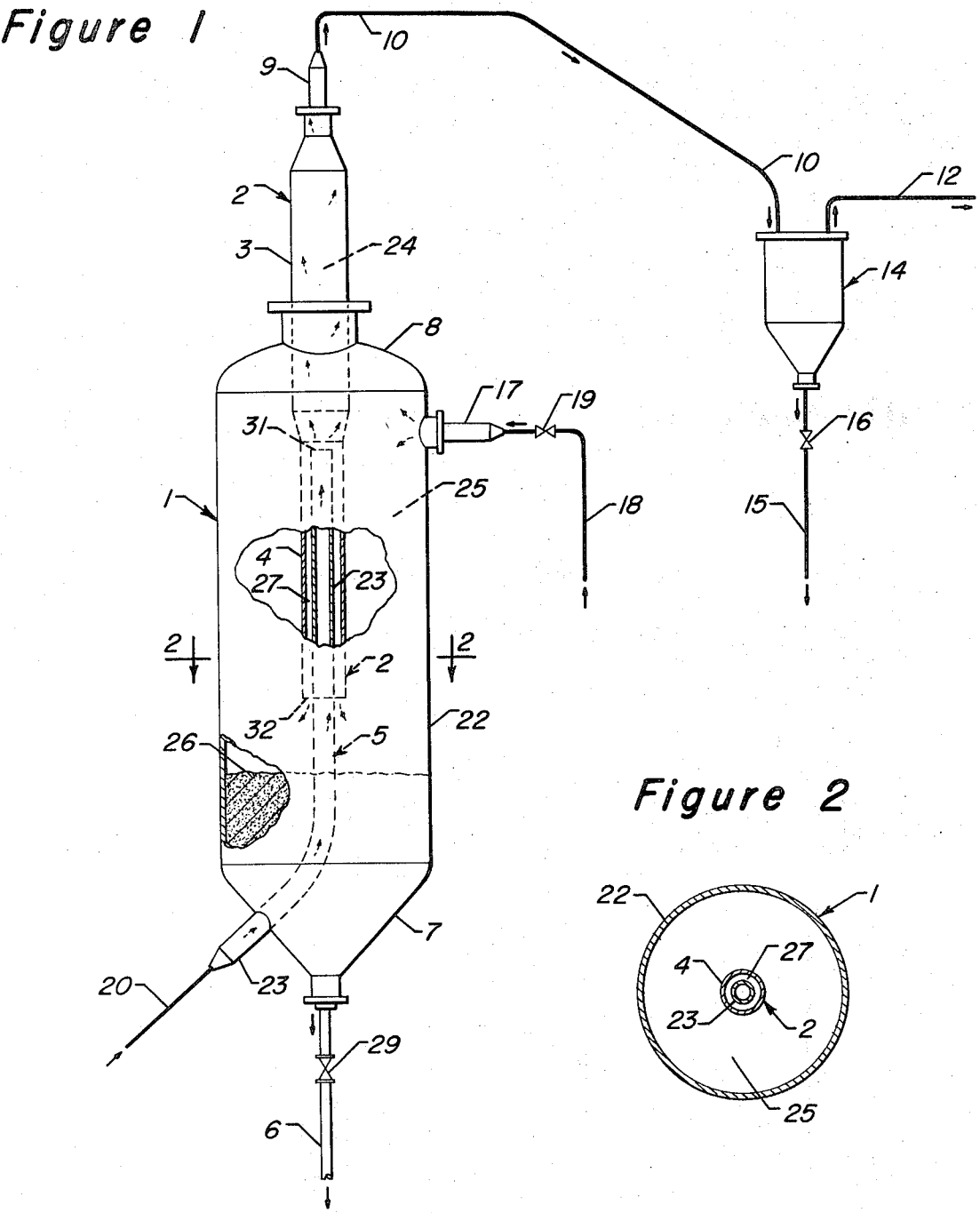

The main components shown in FIG. 1 are: a receiving hopper 1; a vertically positioned elutriation conduit 2; a vertically positioned particle-lift fluid inlet means 5; a fine particle and fluid outlet means 9 connected to the top portion of the elutriation conduit; a particle outlet means 6 connected to the receiving hopper; and, an optional lift fluid inlet means 17 connected to the side of the receiving hopper.

The receiving hopper 1 is essentially a vertically positioned cylinder having cap 8 located on its top and a cone 7 on its bottom. The side walls 22 of the receiving hopper are vertical and the longitudinal axis of the receiving hopper is vertically positioned. As shown in the drawing a dense bed 26 of particles may be collected in a lower section of the receiving hopper.

The elutriation conduit 2 is typically a vertically positioned conduit having upper and lower sections. The upper section 3 of the elutriation conduit has an inside cross-sectional area which is larger than the lower section 4. Preferably the upper and lower sections are vertically positioned, with the upper section always being directly above the smaller lower section.

A particle-lift fluid inlet conduit 5 passes through a lower wall of the receiving hopper and eventually becomes vertically positioned inside the receiving hopper. The particle-lift fluid inlet conduit extends into the lower section of the elutriation conduit, and is axially aligned with the elutriation conduit to form an annular volume 27 in the lower section of the elutriation conduit. Section 23 of the particle-lift gas conduit preferably does not extend into the elutriation conduit a distance higher than the uppermost portion of the lower section of the elutriation conduit. Connected to the particle-lift fluid inlet conduit 5 is line 20, which passes the lift fluid and particles into conduit 5 at a rate regulated by lift engager means not shown. Both the elutriation conduit 3 and the particle-lift fluid inlet conduit means 5 pass into the receiving hopper and are connected to the hopper in a manner so that the interior portion of the receiving hopper is sealed from the atmosphere to prevent leakage of fluid into or out of the receiving hopper.

An optional secondary lift fluid inlet means 17 is preferably connected to the receiving hopper at a side wall portion thereof to admit secondary lift fluid through line 18 at a rate controlled by valve 19. This fluid passes into volume 25 of the receiving hopper, up through annular volume 27 and into volume 24 of the elutriation conduit. Line 10 connects a fines recovery vessel 14 with the fine particle and fluid outlet means 9 located on the upper section of the elutriation conduit and allows fluid and eluted fine particles to be recovered from the elutriation conduit. Typically, the lift fluid and fine particles pass into vessel 14 wherein fine particles can be either filtered or allowed to settle to a lower portion of that vessel. Fine particles can be recovered via line 15 at a rate controlled by valve 16. Lift fluid can be recovered from vessel 14 via line 12, and may be directed back to the receiving hopper via lines 18 or 20, or both.

FIG. 2 shows essentially a horizontal sectional view of the receiving hopper, the elutriation conduit and the particle-lift fluid inlet conduit. Shown are the receiving hopper side wall 22, along with side wall 4 of the lower section of the elutriation conduit, a portion of the particle-lift fluid inlet conduit 23, the annular volume 27 and the internal volume 25 of the receiving hopper.

The above described apparatus functions to separate particles from a lift fluid and to additionally separate fine particles from larger particles. When used in normal operations, a stream containing a fluid and solid particles comprising large and fine particles passes through line 20 into a particle-lift fluid inlet conduit 5. All of the particles and the fluid leave that conduit via its uppermost outlet 31. In a preferred embodiment, a secondary lift fluid passes into the receiving hopper via inlet 17 and eventually enters the lower section of the elutriation conduit through its lower open end 32 and passes in an upward direction through annular volume 27. The lift fluid from conduit 5, together with secondary lift fluid from conduit 17, passes in an upward direction through volume 24 of the upper section 3 of the elutriation conduit causing the elutriation of fine particles present in the upper section of the elutriation conduit. Fine particles and lift fluid are removed from the upper section of the elutriation conduit via fine particle and lift fluid outlet means 9 to be eventually recovered. Larger particles which are not eluted in the upper section 3 of the elutriation conduit 2 pass downward through the annular volume 27 in the lower section of the elutriation conduit and contact the upflowing secondary lift fluid stream, which has a higher velocity than the fluid in the upper section. This causes fine particles not recovered in the upper section of the elutriation conduit to be returned to that section. The particles leave the lower section of the elutriation conduit via its lower outlet 32, fall through volume 25, and eventually end up in bed 26 which is located in a lower section of the receiving hopper. The particles present in bed 26 are substantially free of fine particles, and can be recovered via particle outlet 6 at a rate controlled by valve 29.

DETAILED DESCRIPTION OF THE INVENTION

My invention essentially comprises a two-stage elutriation apparatus which can be used to recover fine particles and lift fluid from a mixture of lift fluid and solid particles. The invention is specifically applicable to processes in which it is desired to transport catalyst from one operating or storage unit to another and to remove fine particles during this transfer.

The materials of construction for all the features of my invention can comprise metal, plastic or any other material which can withstand the wear, pressure and temperature to which the apparatus would be subjected, and the choice of construction materials is not critical.

The receiving hopper is generally vertically positioned and essentially constructed as a vertical cylinder having upper and lower sections which are typically the upper and lower halves of the hopper when bisected by a horizontal plane.

The optional secondary lift fluid inlet conduit can be used when it is desired to control the fluid velocity in the annular volume of the lower section of the elutriation conduit. When this optional inlet conduit is not utilized there will generally be no upflow of fluid in the lower portion of the elutriation conduit other than the lift fluid flowing within conduit 5. The optional secondary lift fluid is preferred, however, since it allows the apparatus to perform a second elution operation on descending particles in the annular volume in the lower section of elutriation conduit. It should be noted that the relative lift fluid velocities in the two sections is in part dependent on the fluid rate through the inlet conduit 5 in addition to the relative cross-sectional areas of the upper and lower sections.

The receiving hopper has a vertically positioned elutriation conduit which generally passes through the upper section of the receiving hopper. The elutriation conduit preferably has an upper section and a lower section, which may be further defined in that the upper section has a larger horizontal cross-sectional area inside of the conduit than the lower section. The elutriation conduit may be wholly contained within the receiving hopper, or as shown in FIG. 1 partially outside of the receiving hopper. As an alternative, the elutriation conduit may be placed on top of the receiving hopper with the bottom of the lower section joined to the hopper. The former arrangements are preferred, however, because of design considerations. Connected to the upper section of the elutriation conduit is a fine particle and fluid outlet means which is used to remove fine particles and lift fluid from the elutriation conduit.

The preferably vertically positioned particle-lift fluid inlet conduit passes through a lower section of the receiving hopper and into the lower section of the elutriation conduit. More preferably the particle-lift fluid inlet conduit is axially aligned with the lower section of the elutriation conduit, and even more preferably, extends within the lower section of the elutriation conduit to a point near the bottom of the upper section of the elutriation conduit. In some instances the particle-lift fluid inlet conduit may extend a small distance into the upper section of the elutriation conduit, or it may end within the conical portion of the elutriation conduit which connects the upper and lower sections.

Upper section 3 and lower section 4 of elutriation conduit 2 are sized in conjunction with the quantity of lift fluid entering through inlet means 5 and 17, to obtain the desired velocity through volume 24 and annular volume 27. The velocity required may be determined by experimental means or may be calculated by methods well known to those skilled in the art. Normally the velocities will be slightly in excess of the terminal settling velocity of the largest size particle to be removed as fines through outlet means 9.

As an example of a working model, the proposed dimensions for a fines separator used on a moving bed continuous reforming unit and patterned after the preferred embodiment shown in the drawing are as follows. The upper section of the elutriation conduit is to be made from a five foot length of 3½ inch schedule 80 pipe, and the lower section of the elutriation conduit from a 50 inch length of 3 inch schedule 80 pipe. The 10 foot 4 inch long elutriation conduit is planned to extend 4 feet 6 inches below the bottom of cap 8 into a receiving hopper having a 36 inch diameter. From the bottom of cap 8 to the top of the cone 7 on the bottom of the receiving hopper is to be 7 feet. One inch schedule 80 pipe may be used for the particle-lift fluid inlet means 5, which preferably ends between the top and bottom of the cone-shaped reducer between the top and bottom sections of the elutriation conduit. With the design conditions of 10 p.s.i.g. of 500°F., carbon steel may be used for the vessel. For the very specific purpose of this design, which is removing catalyst fines from the regeneration loop of a moving bed reformer, design flow rates are about 10. feet per sec. in the lower section of the elutriation conduit and about 9.0 feet per sec. in the upper section. With these velocities the separation between fines and catalyst is very sharp, with 100 percent removal of fines with a diameter of 0.023 inches through outlet means 9 and only 1 percent removal of particles with a diameter of 0.040 inches.

I claim as my invention:

1. A particle disengaging and fines removal apparatus comprising in combination:
   a. a receiving hopper comprising a vertically positioned enclosed vessel having upper and lower sections;
   b. a vertically positioned elutriation conduit connected to the upper section of said receiving hopper and in communication with said receiving hopper, said elutriation conduit comprising upper and lower sections with said upper section of said conduit having a larger internal horizontal cross-sectional area than said lower section of said conduit;
   c. a fine particle and fluid outlet means connected to the upper section of said elutriation conduit to allow the removal of fine particles and fluid from said elutriation conduit;
   d. a vertically positioned particle-lift fluid inlet conduit means passing through an outer wall of said receiving hopper and extending in an upward direction into said hopper and into the lower section of said elutriation conduit, to thereby allow the passage of particles and lift fluid through said conduit means and into said elutriation conduit; and,
   e. particle outlet means connected to said receiving hopper to allow the passage of particles out of said hopper.

2. The apparatus of claim 1 wherein said particle-lift fluid inlet conduit extends within said lower section of said elutriation conduit up to the top of said lower section.

3. The apparatus of claim 1 wherein said particle outlet means is connected to said lower section of the receiving hopper.

4. The apparatus of claim 1 wherein a secondary lift fluid inlet means is connected to said receiving hopper to allow the passage of additional lift gas into said receiving hopper.

5. A particle disengaging and fines removal apparatus comprising in combination:
   a. a receiving hopper comprising a vertically positioned enclosed cylindrical vessel having upper and lower sections;
   b. a vertically positioned elutriation conduit connected to the upper section of said receiving hopper and extending within said hopper in a downward direction, said elutriation conduit comprising upper and lower sections, with said upper section of said conduit having a larger internal cross-sectional area than said lower section of said conduit;
   c. a fine particle and fluid outlet means connected to the upper section of said elutriation conduit to allow the removal of fine particles and fluid from said elutriation conduit;
   d. a vertically positioned particle-lift fluid inlet conduit passing through an outer wall of said receiving hopper and extending in an upward direction through said hopper and into the lower section of said elutriation conduit, to allow the passage of particles and lift fluid through said conduit means and into said elutriation conduit;
   e. a particle outlet means connected to said receiving hopper to allow the passage of particles out of said hopper;
   f. a secondary lift fluid inlet means connected to said receiving hopper to allow the passage of lift fluid into said receiving hopper and through said elutriation conduit.

6. The apparatus of claim 5 wherein said particle-lift fluid inlet conduit is positioned to extend within said lower section of said elutriation conduit up to the top of said lower section.

7. The apparatus of claim 5 in that said particle-lift fluid inlet conduit is positioned in said lower section of said elutriation conduit to form an elutriation annular volume between the inside of said elutriation conduit and the outside of the particle-lift fluid conduit.

* * * * *